United States Patent
Irikura

[11] Patent Number: 6,105,199
[45] Date of Patent: *Aug. 22, 2000

[54] WINDSHIELD WIPER

[75] Inventor: Shuichi Irikura, Hoi-gun, Japan

[73] Assignee: Amso Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/073,502

[22] Filed: May 5, 1998

[30] Foreign Application Priority Data

Jun. 18, 1997 [JP] Japan ................................. 9-161508
Mar. 6, 1998 [JP] Japan ................................. 10-055151

[51] Int. Cl.⁷ ........................... B60S 1/36; B60S 1/34
[52] U.S. Cl. ................ 15/250.21; 15/250.3; 15/250.31
[58] Field of Search ................ 15/250.21, 250.23, 15/250.3, 250.15, 250.27, 250.17, 250.31; 74/43, 42

[56] References Cited

U.S. PATENT DOCUMENTS

| | | | |
|---|---|---|---|
| 1,104,565 | 7/1914 | Sonderegger | 15/250.15 |
| 2,744,282 | 5/1956 | Dyer et al. | 15/250.3 |
| 3,649,988 | 3/1972 | Mellor | 15/250.3 |
| 4,683,605 | 8/1987 | Leroy et al. | 15/250 |
| 4,776,057 | 10/1988 | Beneteau et al. | 15/250.21 |
| 5,884,357 | 3/1999 | Schill et al. | 15/250.21 |

FOREIGN PATENT DOCUMENTS

| | | | |
|---|---|---|---|
| 3826506 | 2/1990 | Germany | 15/250.3 |
| 4323551 | 1/1994 | Germany | 15/250.3 |
| 7-228221 | of 1995 | Japan . | |
| 1142325 | 2/1985 | U.S.S.R. | 15/250.3 |
| 875036 | 8/1961 | United Kingdom | 15/250.3 |

*Primary Examiner*—Gary K. Graham
*Attorney, Agent, or Firm*—Fish & Richardson P.C.

[57] ABSTRACT

A wiping radius of a wiper arm having a wiper blade connected to its top end is changed by a four-link linkage so that the wiper blade can clean a far corner of a windshield. The four-link linkage is constituted by two links pivotally connected to the wiper arm and to both axes fixed to a stationary frame, the wiper arm, and a stationary link formed between both axes. The wiper arm with the four-link linkage is driven by a drive mechanism including a motor and swings between upper and bottom positions. A passive biasing member is connected to the four-link linkage, so that the upward movement of the wiper arm from the bottom position is assisted and the downward movement toward the bottom position is resisted by the biasing member, thereby making driving load imposed on the motor substantially equal in both movements.

17 Claims, 9 Drawing Sheets

ASCENDING    DESCENDING

WINDSHIELD WIPER

CROSS-REFERENCE TO RELATED APPLICATIONS

This application is based upon and claims benefit of priority of Japanese Patent Applications No. Hei-9-161508 filed on Jun. 18, 1997, and No. Hei-10-55151 filed on Mar. 6, 1998, the contents of which are incorporated herein by reference.

BACKGROUND OF THE INVENTION

1. Field of the Invention

The present invention relates to a windshield wiper for an automobile in which a wiping radius is varied by using a four-link linkage so that a far corner of a windshield can be cleaned by a wiper blade.

2. Description of Related Art

A windshield wiper for an automobile usually has a constant wiping radius because its pivotal center is fixed. The far corner of a windshield cannot be cleaned by the usual windshield wiper though it is desired to wipe a large area to secure a good view for a driver. A wiper for cleaning the far corner of the windshield has been proposed, for example, in JP-A-61-181745. A five-link linkage mechanism is used in the proposed wiper to enlarge the wiping radius at the far corner of the windshield so that the far corner can be also cleaned by a wiper blade.

FIG. 15 shows a similar kind of a conventional wiper in which a four-link linkage is used. Wiper arm 51 including retainer 57 is pivotally supported by first link 54 and second link 55. Wiper blade 56 for wiping the windshield is supported at the top end of wiper arm 51. First link 54 is pivotally supported by first axis 52 at its one end, and second link 55 is also pivotally supported by second axis 53 at its one end. Both first and second axes 52, 53 are fixed to a vehicle frame and constitutes a stationary link 100. Four-link linkage 58 is constituted by wiper arm 51, first link 54, second link 55 and stationary link 100. Actuator lever 64 is rigidly fixed to first link 54 to form a single straight link pivotally supported by first axis 52. Actuating lever 64 is driven by a drive mechanism. The drive mechanism incudes motor 59, worm 60 rotated by motor 59, worm wheel 61 engaging worm 60, crank lever 62 driven by worm wheel 61, and link rod 63 connecting crank lever 62 to actuator lever 64. Actuator lever 64 is pivotally rotated around first axis 52, and thereby first link 54 fixed to actuator lever 64 is pivotally driven around first axis 52. Thus, wiper arm 51 is driven back and forth between tow positions, a bottom position (a home position) and an upper position. During one rotation of worm wheel 61, wiper arm 51 makes one round trip from the bottom position to the upper position and from the upper position back to the bottom. The wiping radius of the wiper becomes maximum at an interim position between the bottom and upper positions, thereby wiping the far corner of the windshield.

This kind of wiper is usually used in a large size vehicle, and it is bulky and heavy because of the four-link linkage, compared with a wiper having a constant wiping radius. Also, a higher driving force is required especially when the moving direction of the wiper is switched at a turning position, because power transmission efficiency of the drive mechanism becomes low at the turning position. FIG. 16 shows motor load which is required near the bottom position. The left graph shows motor load A required when the wiper ascends from the bottom position, and the right graph shows motor load B required when the wiper descends toward the bottom position. When the wiper arm makes a turn and ascends upward from the bottom position, the force required to lift up the wiper arm (which is equal to motor load A) is: $Fa+Fg+Fm$, where $Fa$ is a force for accelerating the wiper arm at a predetermined acceleration, $Fg$ is a gravitational force due to the weight of the wiper arm and the links, and $Fm$ is a force due to friction at axes and pivotal joints. On the other hand, the force required when the wiper arm is descending toward the bottom position (which is equal to load B) is: $Fb+Fm-Fg$, where $Fb$ is the force for driving the wiper arm downward toward the bottom position. Gravitational force $Fg$ is added when the wiper arm is ascending while it is subtracted when the wiper arm is descending. Therefore, the highest motor load is required when the wiper is ascending from the bottom position.

For the reason mentioned above, a large motor which is able to cover the highest load A has to be used in the conventional wiper having the variable wiping radius.

SUMMARY OF THE INVENTION

The present invention has been made in view of the above-mentioned problem, and an object of the present invention is to provide a windshield wiper having a four-link linkage for varying a wiping radius, which can be driven by a relatively small motor though the windshield wiper is relatively heavy because of the four-link linkage. Another object of the present invention is reduce an overrun which occurs when the wiper changes its wiping direction.

According to the present invention, a member for giving a biasing force to the four-link linkage is used to assist the turning motion of the wiper arm at its turning positions, an upper position and a bottom position. The biasing member such as a coil spring or a resilient rubber bushing is attached to a portion of the four-link linkage. A coil spring may be attached to one end of a link constituting the four-link linkage, or a resilient rubber bushing may be disposed on one of the fixed axes supporting the four-link linkage or one of the joints pivotally connecting the wiper arm and links of the four-link linkage.

When the wiper arm is descending toward its bottom position, the biasing member resists the movement, and when the wiper arm is ascending upward from the bottom position, the biasing member assists the movement. Load imposed on the driving motor becomes maximum when the wiper arm is ascending from its bottom position, because gravitational force due to the weight of the wiper arm including the four-link linkage is added to the driving force required to accelerate upward the wiper arm. Since the biasing force resists the downward movement and assists the upward movement, a driving force difference between the downward and upward movements becomes small. Preferably, the biasing force of the biasing member is selected so that the motor loads for both upward and downward movements become substantially equal. Because the maximum load imposed on the motor is thus reduced, the motor size can be reduced to make the system compact.

When the wiper arm is approaching the upper position, the biasing force resists the movement of the wiper arm. Therefore, the wiper arm movement beyond the upper position (overrun) is suppressed by the biasing force. After the wiper arm makes a turn at the upper position, the biasing force assists the wiper arm movement.

Preferably, the biasing force is set, so that no biasing force is exerted on the four-link linkage when the wiper arm takes an interim position between the upper and bottom positions, while the biasing force becomes maximum at the bottom position.

Other objects and features of the present invention will become more readily apparent from a better understanding of the preferred embodiments described below with reference to the following drawings.

DETAILED DESCRIPTION OF THE PREFERRED EMBODIMENTS

Figure 3:
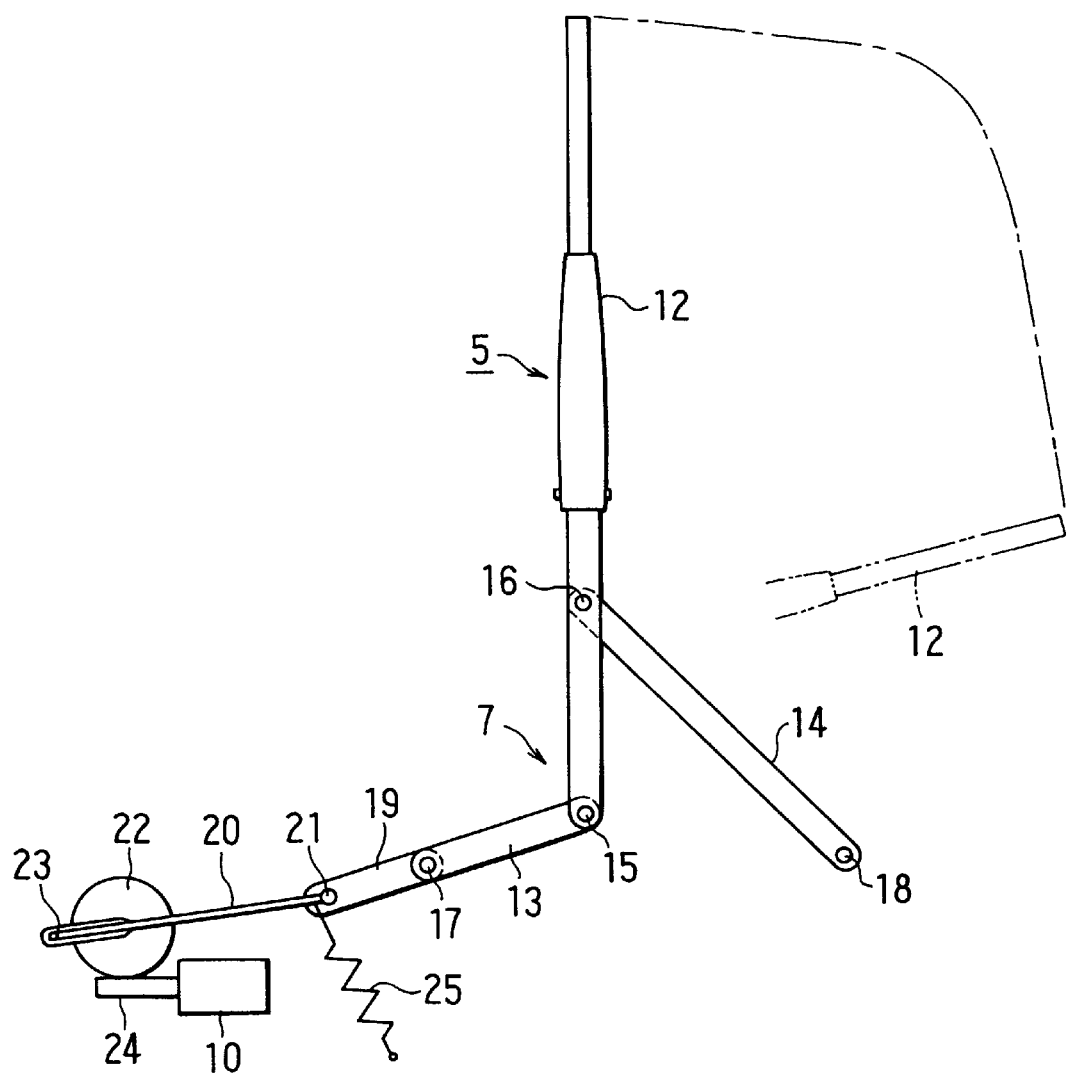
FIG. 3 is a schematic plan view showing the windshield wiper shown in FIG. 1 at its upper position.
Figure 4:
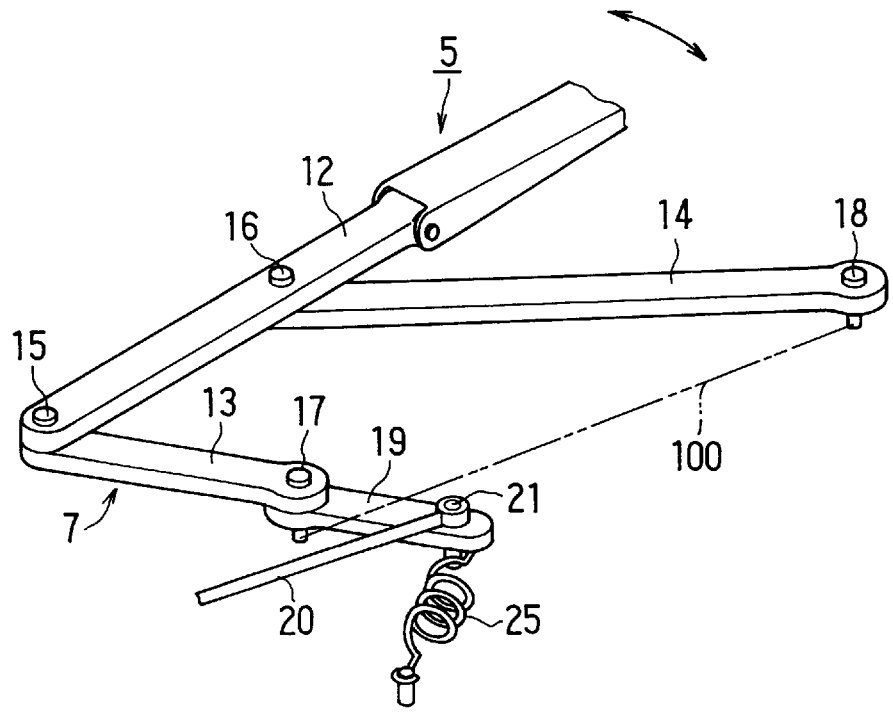
FIG. 4 is a perspective view showing the windshield wiper shown in FIG. 1.
Figure 5:
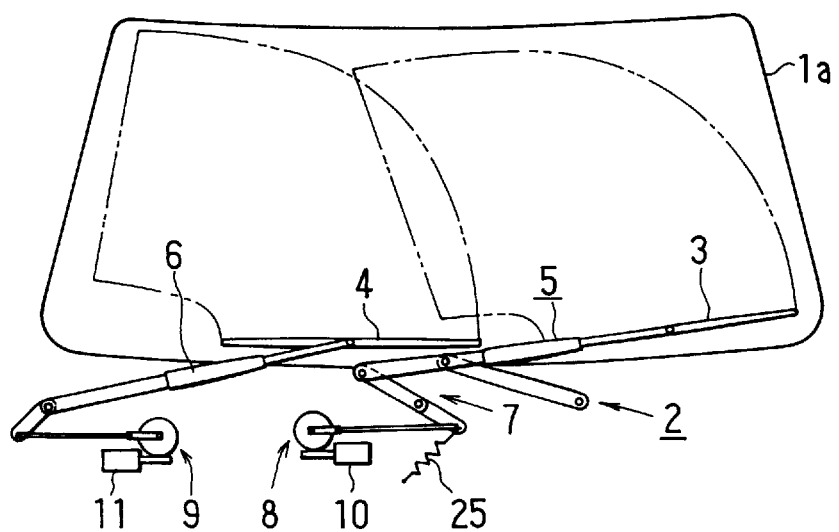
FIG. 5 is a schematic view showing a front windshield of an automobile where the windshield wiper shown in FIG. 1 is installed together with another windshield wiper.

Referring to FIGS. 1 to 7, a first embodiment according to the present invention will be described. As shown in FIG. 5, windshield wiper 2 having four-link linkage 7 is installed on the right side of front windshield 1a of an automobile, and a conventional wiper is installed on the left side. Each wiper cleans the right or left half of windshield 1a. Wiper 2 includes wiper arm 5 carrying wiper blade 3 for wiping windshield 1a, four-link linkage 7, drive mechanism 8 having motor 10, and biasing spring 25. The conventional wiper installed on the left side includes wiper arm 6 carrying wiper blade 4, drive mechanism 9 having motor 11. The present invention is applied to the wiper installed on the right side. As shown in FIG. 5, the right side wiper wipes a wide area including the far corner (an upper right corner) of windshield 1a.

Figure 1:
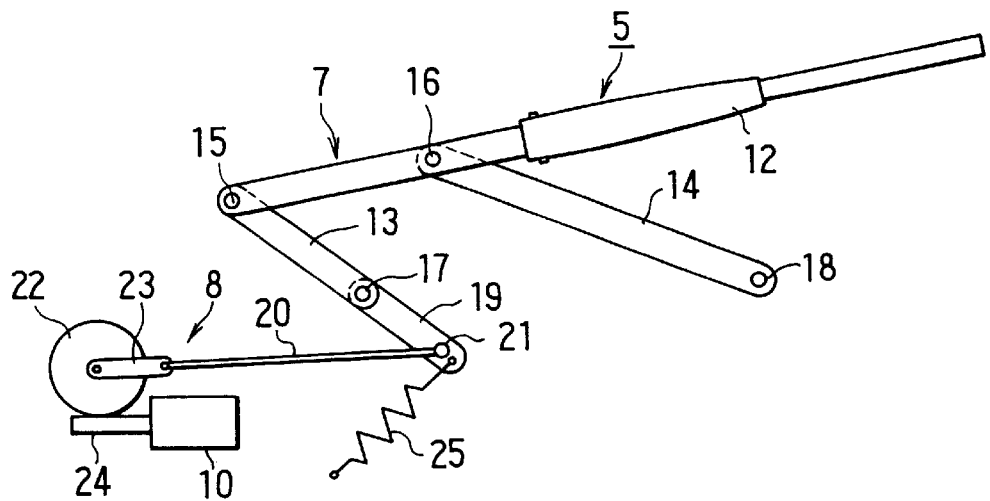
FIG. 1 is a schematic plan view showing a windshield wiper as a first embodiment according to the present invention, at its bottom position (home position)
Figure 2:
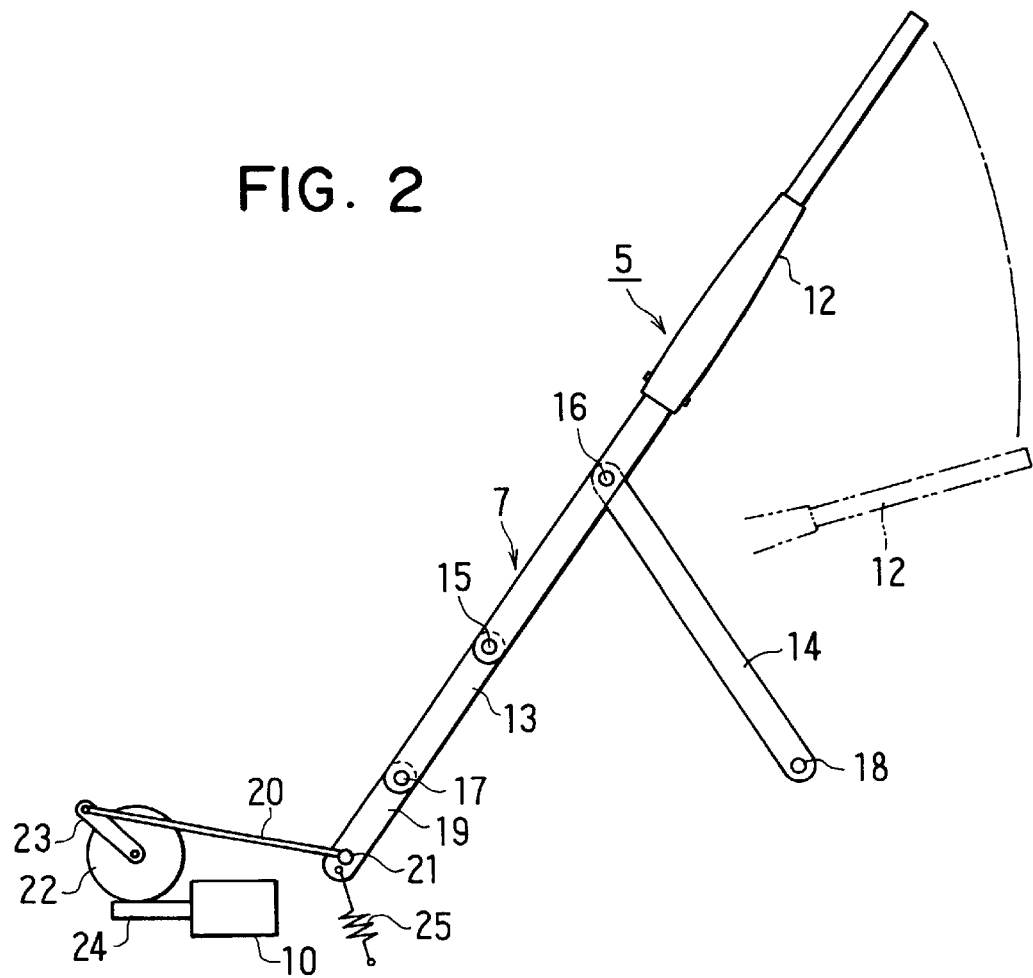
FIG. 2 is a schematic plan view showing the windshield wiper shown in FIG. 1 at its interim position.

Details of the right side wiper shown in FIG. 5 are shown in FIGS. 1, 2 and 3, each showing its bottom position (home position), interim position and upper position, respectively. FIG. 4 is a perspective view showing a part of the windshield wiper. Wiper arm 5 including retainer 12 and rods connected to both ends of retainer 12 is pivotally supported by first link 13 at first pivot 15 and by second link 14 at second pivot 16. First and second links 13, 14 are pivotally supported by first axis 17 and second axis 18, respectively. First and second axes are fixed to a frame of an automobile, constituting stationary link 100 (FIG. 4). Four-link linkage 7 is constituted by wiper arm 5, first link 13, second link 14 and stationary link 100. Actuator lever 19 is connected to first link 13 to form a single straight lever and is pivotally supported by first axis 17. Drive mechanism 8 includes motor 10, worm 24 rotated by motor 10, worm wheel 22 engaging with worm 24, crank lever 23 rotated by worm wheel 22, and link rod 20 connected to crank lever 23. One end of link rod 20 is rotatably connected to actuator lever 19 at third pivot 21. Actuator lever 19 swings around first axis 17 together with first link 13 according to rotation of worm wheel 22. Biasing spring 25 is connected to the bottom end of actuator lever 19 so that biasing spring 25 exerts biasing force on actuator lever 19 in a direction to lift up wiper arm 5 from its bottom position.

Wiper arm 5 takes the bottom position shown in FIG. 1 when crank lever 23 takes the position shown in FIG. 1. As worm wheel 22 rotates and crank lever 23 takes the position shown in FIG. 2, wiper arm 5 takes the interim position shown in FIG. 2. As worm wheel 22 further rotates and crank lever 23 takes the position shown in FIG. 3, wiper arm 5 takes the upper position shown in FIG. 3. As worm wheel 22 further rotates, wiper arm 5 returns to its bottom position again. Thus, wiper arm 5 moves back and forth between the bottom position and the upper position. When wiper arm 5 takes the interim position, its wiping radius becomes maximum, and thereby the far corner (upper right corner) of windshield 1a is cleaned by wiper blade 3.

Coil spring 25 is used as the biasing spring in this embodiment. Coil spring 25 is connected to the bottom end of actuator lever 19 to pull it in a direction perpendicular to the longitudinal direction of actuator lever 19 when the wiper arm takes the bottom position shown in FIG. 1. Coil spring 25 becomes shortest (a natural length which exerts no biasing force) when wiper arm takes the interim position shown in FIG. 2, and it is extended again when wiper arm 5 takes the upper position shown in FIG. 3. In other words, coil spring 25 functions to assist turning movement of wiper arm 5 when it switches its wiping direction at the bottom and upper positions. The strength of coil spring 25 is chosen so that the motor load becomes substantially equal for both situations, when wiper arm 5 is descending toward the bottom position, and when it is ascending after making a turn at the bottom position.

Figure 6:
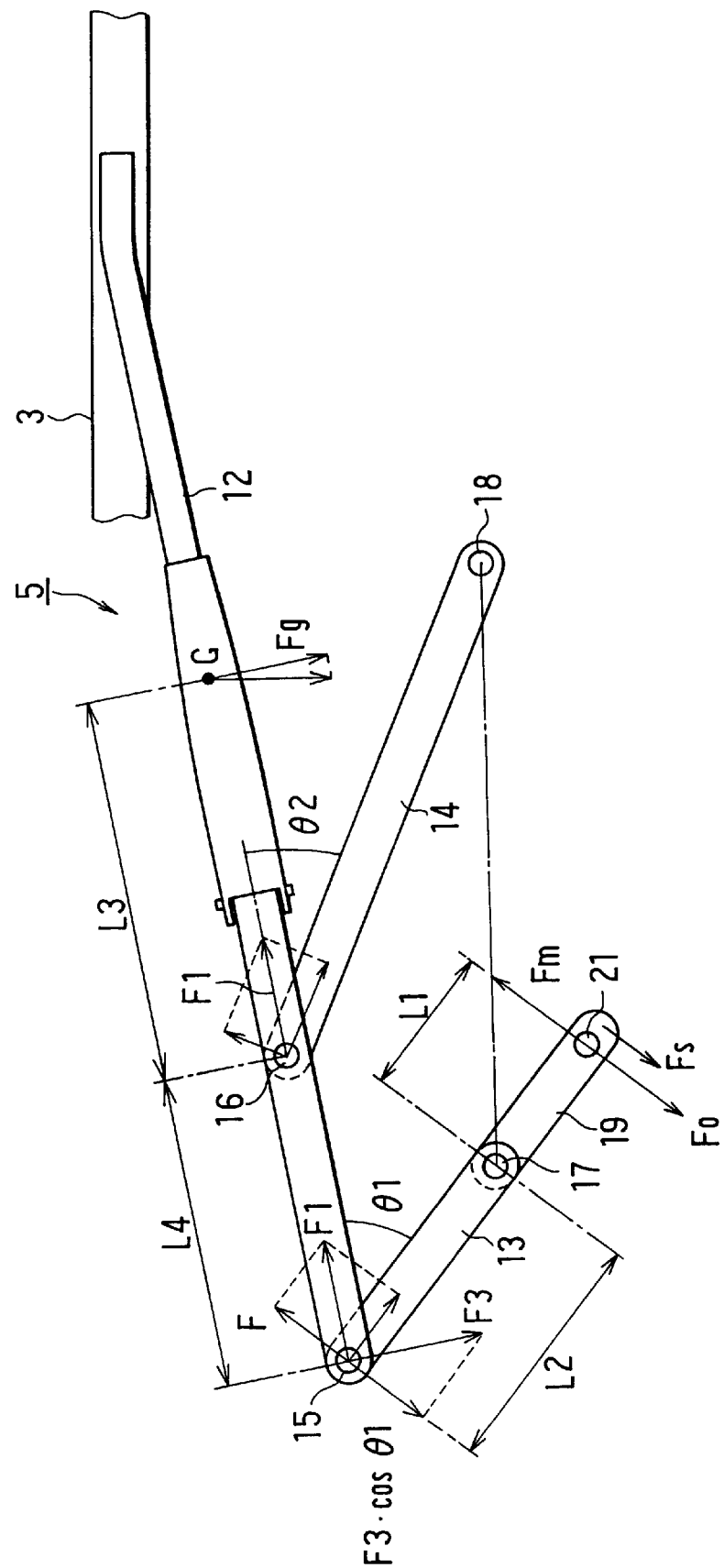
FIG. 6 is a schematic view showing the windshield wiper shown in FIG. 1, for explaining various forces imposed on portions of the windshield wiper.

FIG. 6 shows force imposed on various portions of the windshield wiper when it is ascending upward after making a turn at the bottom position. To lift up wiper arm 5, force F is transmitted to first pivot 15 from motor 10. There are frictional forces Fm1, Fm2 at first and second pivots 15, 16 (Fm1=$\mu$1·F1·cos θ1; Fm2=$\mu$2·F1·cos θ2, where $\mu$1, $\mu$2 are friction coefficients of first and second pivots 15, 16, respectively; F1 is a longitudinal component on wiper arm 5 to lift up wiper arm 5; θ1 is an angle made by wiper arm 5 and first link 13; and θ2 is an angle made by wiper arm 5 and second link 14). Gravitational force Fg is also imposed on a weight center G of wiper arm 5 (Fg is a component perpendicular to the longitudinal direction of wiper arm 5). Considering a moment balance around second pivot 16, Fg·L3 is equal to F3·L4 (where L3 is a distance from second pivot 16 to gravity center G, L4 is a distance from first pivot 15 to second pivot 16, and F3 is a component in the direction perpendicular to the longitudinal direction of wiper arm 5). Therefore, F3=Fg·L3/L4, and a force component imposed on first pivot 15 in an opposite direction to force F is F3·cos θ1. Also, a biasing force Fs is imposed on the bottom end of actuator lever 19 by biasing spring 25. Force Fm due to frictional forces Fm1 and Fm2 is imposed on third pivot 21 in a direction opposite to Fs. Force F0 to be imposed on third pivot 21 to lift up wiper arm 5 from the bottom position is expressed as follows:

$$F0=[(F1+F3 \cdot \cos \theta 1) \cdot L2/L1]+Fm-Fs,$$

where L1 is a distance between first axis 17 and third pivot 21, and L2 is a distance between first axis 17 and first pivot 15. On the other hand, force F'0 to be imposed on third pivot 21 to lower wiper arm 5 toward the bottom position is expressed as follows (force imposed in the same direction as the wiper movement is expressed as a positive value):

$$F'0=[(F2-F3 \cdot \cos \theta 1) \cdot L2/L1]+Fm+Fs,$$

where F2 is a longitudinal component on wiper arm 5 to lower wiper arm 5 toward the bottom position. F2 is smaller than F1, because a larger force is required to overcome inertia when the wiping direction is switched at the bottom position.

Figure 7:
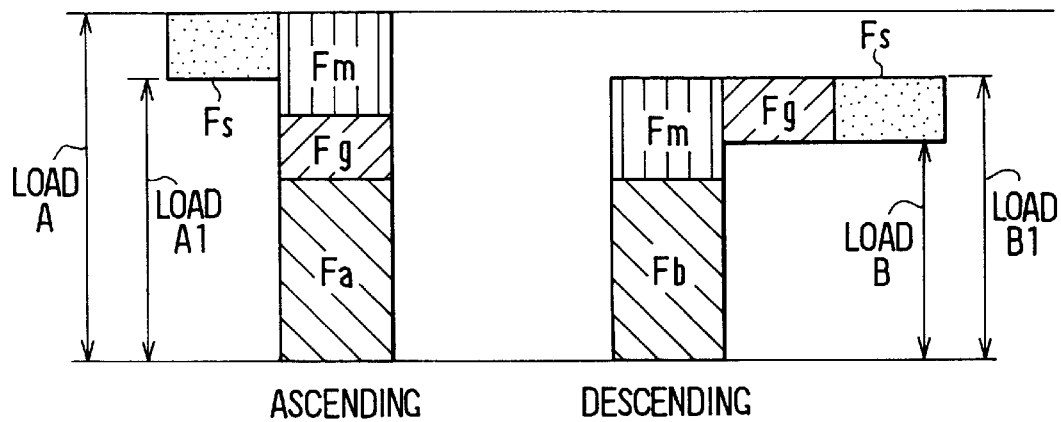
FIG. 7 is a graph showing load for driving the windshield wiper.

FIG. 7 shows graphically what was described above. In this graph, Fa is a force to give wiper arm a predetermined upward acceleration (Fa=F1·L2/L1), and Fb is a force to descend wiper arm 5 toward the bottom position (Fb=F2·L2/L1). As seen from the graph, a total load A for lifting the wiper arm from the bottom position is: Fa+Fg+Fm. A required motor load A1 is: load A−Fs. This is because biasing force Fs of spring 25 assists the upward movement of the wiper arm. A total load B for lowering the wiper arm toward the bottom position is: Fb+Fm−Fg, because gravitational force Fg is subtracted in this situation. A required motor load B1 is: load B+Fs, because biasing force Fs of spring 25 is an additional load in this situation. The strength of biasing spring 25 is chosen so that the motor load in both ascending and descending movements becomes equal (A1=B1). Fs is set in this embodiment as: Fs=Fg+(Fa−Fb)/2. Frictional force between the wiper blade and the windshield are neglected in selecting the biasing force in this embodiment, because it is small. However, the biasing force may be selected, taking the frictional force into consideration.

In summary, the biasing spring has a natural length at the interim position and it is pulled and expanded in both bottom and upper positions. In the vicinity of the bottom position, the biasing force functions to slow down the downward movement when the wiper arm is descending, and it functions to assist the upward movement when the wiper arm is ascending from the bottom position. In the vicinity of the upper position, the biasing force functions to slow down the upward movement, thereby preventing an overrun beyond the upper position, and it functions to assist a turning movement when the wiper arm leaving the upper position toward the bottom position. Therefore, the motor load required to lift up the wiper arm from the bottom position is made smaller, compared with that in a system having no biasing force. In addition, since the system is designed so that load A1 is substantially equal to load B1 as mentioned above, the amount of the motor load reduction by the biasing spring is maximized.

Advantages of the first embodiment are summarized as follows: (1) The motor size can be made smaller, because the biasing force functions to reduce the maximum load of the motor. (2) The amount of the motor load reduction is maximized, because the loads for upward and downward movements at the vicinity of the bottom position are equalized. (3) The biasing force is effectively utilized, because it is applied to the actuator lever in a direction perpendicular to its longitudinal direction. (4) The over-running movement at the upper position is effectively avoided, because the spring is expanded and slows down the forward movement. (5) The driving mechanism is made compact, because the maximum motor load is reduced.

Figure 8:
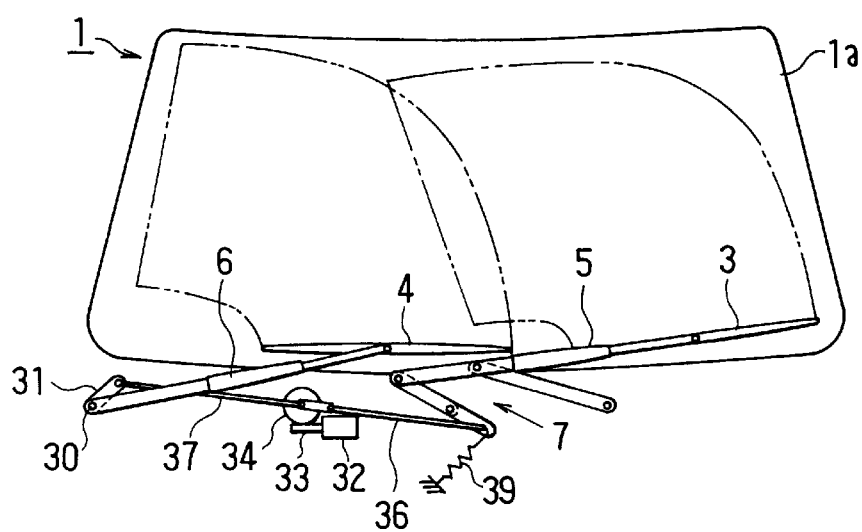
FIG. 8 is a schematic view showing a windshield wiper as a second embodiment according to the present invention, which is mounted on a front windshield of an automobile.
Figure 9:
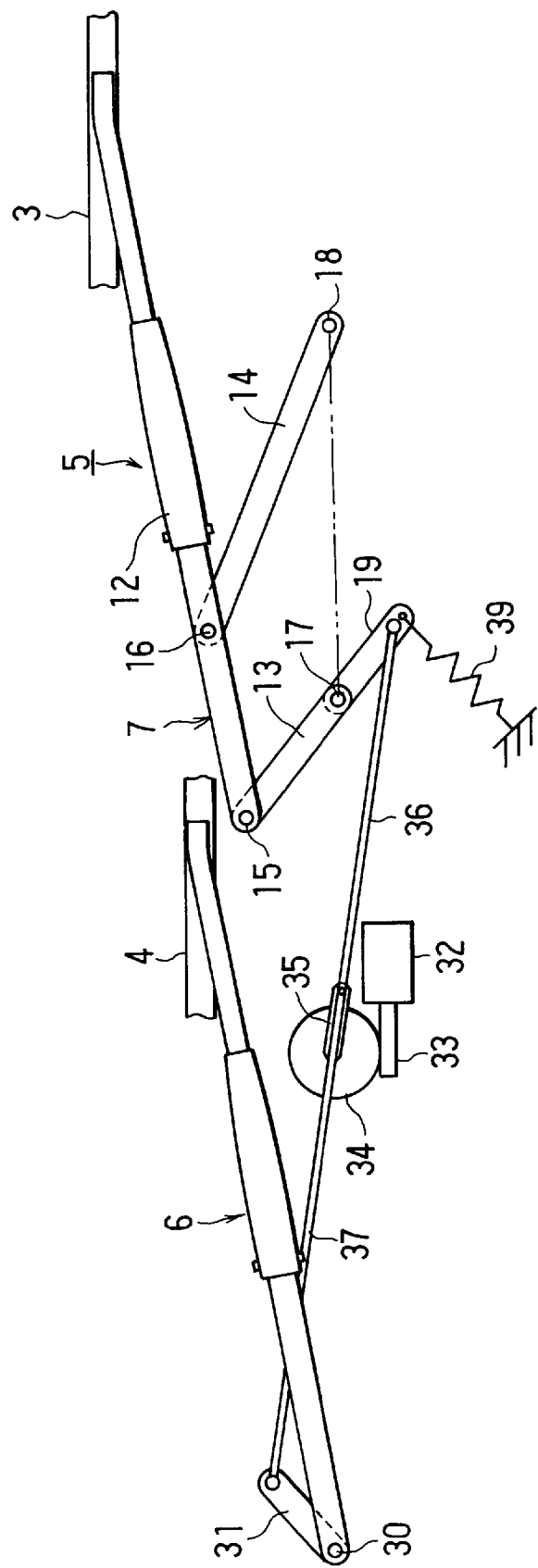
FIG. 9 is a schematic view showing details of the windshield wiper shown in FIG. 8.

A second embodiment according to the present invention will be described, referring to FIGS. 8 and 9. As shown in FIG. 8, wiper arm 5 having a four-link linkage is used on the right side of the windshield, and a conventional wiper arm having no four-link linkage is used on the left side of the windshield. Both wiper arms 5, 6 are driven by a common drive mechanism. Components or parts which are the same as those in the first embodiment are numbered with the same numerals, and only the features different from the first embodiment will be described here.

Conventional wiper arm 6 carrying wiper blade 4 supported at its top end is pivotally supported by axis 30 fixed to the body frame. Actuator lever 31 is connected to wiper arm 6 at axis 30, and wiper arm 6 is operated by actuator lever 31. Motor 32 has worm 33 which drives worm wheel 34. Drive lever 35 (FIG. 9) is fixed to worm wheel 34 and drives both link rods 36, 37. Link rod 37 drives actuator lever 31 of the left side wiper, and link rod 36 drives actuator lever 19 of the right side wiper. Biasing spring 39 is connected to the bottom end of actuator lever 19 in the same manner as in the first embodiment. The structure of wiper arm 5 including four-link linkage 7 is the same as that of the first embodiment. However, since both wiper arms 5, 6 are driven by a common drive mechanism, it is necessary to consider gravitational force and inertia force of conventional wiper arm 6 in addition to those of wiper arm 5 in determining the strength of biasing spring 39. The strength of biasing spring 39 is set so that both loads for lifting and lowering wiper arm 5 at the vicinity of the bottom position becomes equal. Substantially the same advantages as in the first embodiment are attained in the second embodiment in which both wipers are driven by a common drive mechanism.

Figure 10:
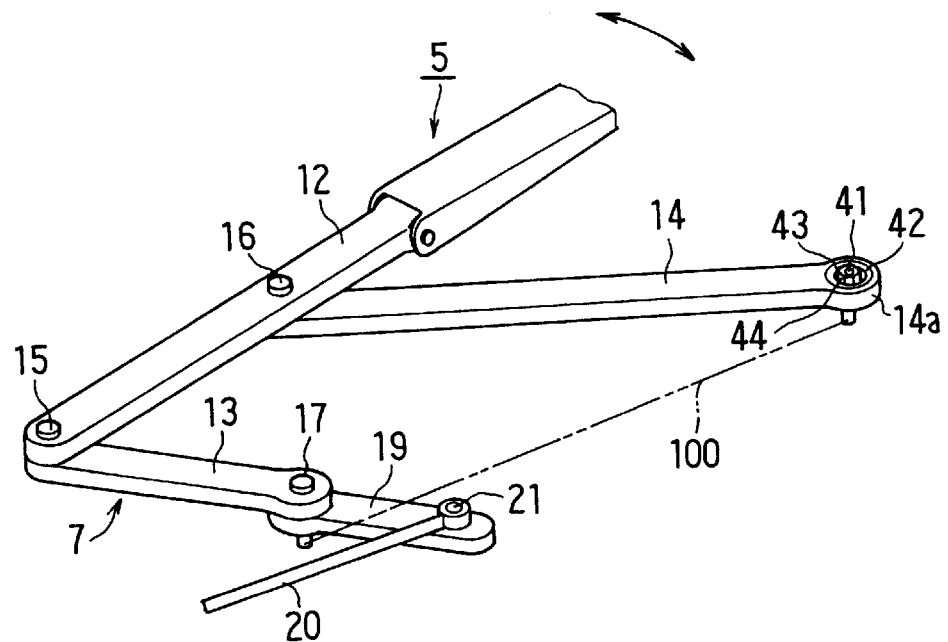
FIG. 10 is a perspective view showing a part of a windshield wiper as a third embodiment according to the present invention.
Figure 11A:
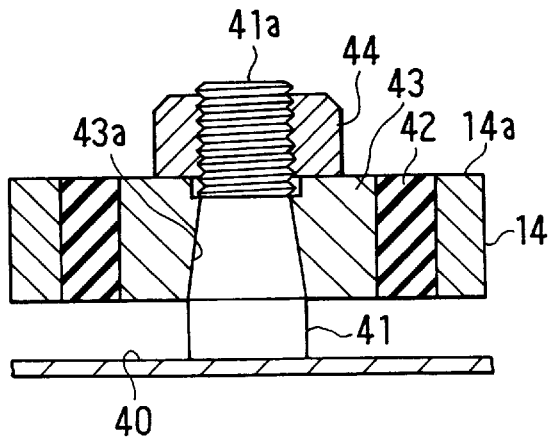
FIG. 11A is a cross-sectional view showing a structure for mounting a second link on a second axis of the windshield wiper shown in FIG. 10.
Figure 11B:
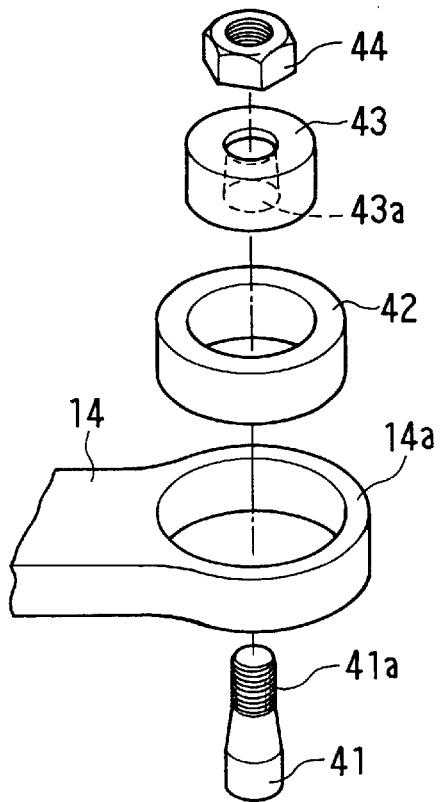
FIG. 11B is a perspective view showing components used in the mounting structure shown in FIG. 11A.

Referring to FIGS. 10, 11A and 11B, a third embodiment will be described. In this embodiment, twisting resilient force of a rubber bushing is used as the biasing force in place of the biasing force of the spring in the first and second embodiments. As shown in FIG. 10, the wiper arm structure including the four-link linkage is the same as that of the first embodiment except for a structure for giving the biasing force. Therefore, parts or components which are the same as those of the first embodiment are numbered with the same numerals, and explanation for those is not repeated here. Resilient rubber bushing 42 is disposed in a portion pivotally connecting second link lever 14 to second axis 41 as shown in FIG. 10. The detailed structure is shown in FIGS. 11A and 11B. Second link 14 has outer ring 14a formed at its bottom end. Rubber bushing 42 is disposed in outer ring 14a, and metallic inner ring 43 having tapered hole 43a for connecting second link 14 to second axis 41 is disposed in rubber bushing 42. Outer ring 14a, rubber bushing 42 and inner ring 43 are all fixed together into a single piece, for example, by a rubber vulcanization process. Second axis 41 fixed to frame 40 has a tapered portion which is inserted into tapered hole 43a and thread 41a on its top. Second link 14 having rubber bushing 42 and other components fixed thereto is connected to second axis 41 and fastened thereto by nut 44, as shown in FIG. 11A.

Second link 14 is mounted on and fastened to second axis 41 so that rubber bushing 42 takes a natural state in which no twisting resilient force exists when wiper arm 5 takes the interim position between the upper and bottom positions. Rubber bushing 42 is twisted when wiper arm 5 swings to the upper or bottom position, thereby exerting the biasing force on second link 14. Therefore, when wiper arm 5 swings toward the bottom position, its movement is slowed down by the resilient force of the twisted rubber bushing, and when wiper arm 5 is lifted up from the bottom position, its upward movement is accelerated by the resilient force of rubber bushing 42. In the same manner, the over-running movement of wiper arm 5 at the vicinity of the upper position is avoided by the resilient force of the twisted rubber bushing, and the turning movement at the upper position is assisted by the resilient force. Preferably, the interim position where rubber bushing takes the natural state is adjusted so that the lifting load from the bottom position becomes equal to the lowering load toward the bottom position at the vicinity thereof.

Since rubber bushing 42 mounted on second link 14 is used in this embodiment in place of the spring, the structure of the windshield wiper having the four-link linkage can be made more compact. Also, the assembling process will be simplified. Other advantages of the third embodiment are similar to those of the first embodiment.

Figure 12:
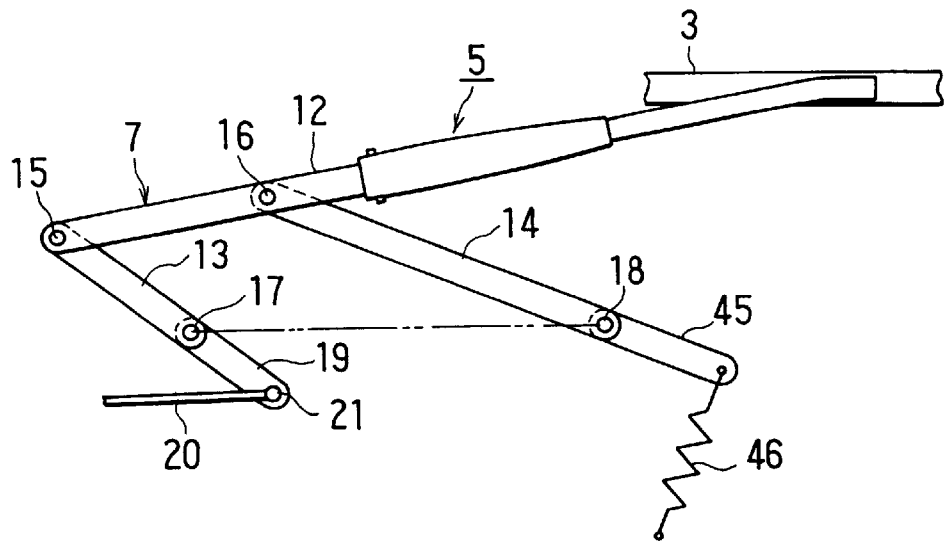
FIG. 12 is a schematic view showing a modified form of the windshield wiper according to the present invention.

The embodiments described above may be modified in various ways. Some examples of modification will be described below. As shown in FIG. 12, additional lever 45 may be connected to second link 14 to form a single lever, and biasing spring 46 is hooked to the bottom end of lever 45. When the strength of spring 46 is properly chosen, the same advantages as those of the first embodiment are obtained in this modified form, too.

Figure 13:
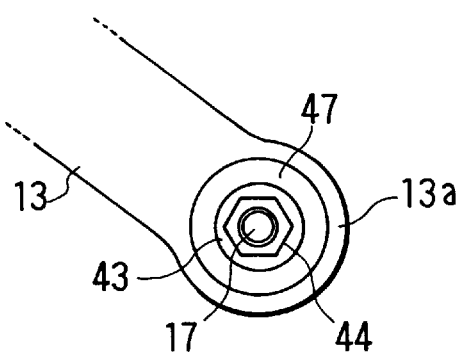
FIG. 13 is a fragmentary view showing a modified form of the mounting structure shown in FIG. 10.

Rubber bushing 42 of the third embodiment may be disposed on first link 13 in stead of second link 14 as shown in FIG. 13. In this case, actuator lever 19 is removed from first link 13 and connected to second link 14, and second link 14 is driven by drive mechanism 8. First link 13 is modified to include outer ring 13a, rubber bushing 47 and inner ring 43, all being connected into one piece as in the third embodiment. First link 13 is connected to first axis 17 and fastened thereto by nut 44. Rubber bushing 47 is set in the same manner as in the third embodiment. Resilient coefficient of rubber bushing 47 in this modification has to be carefully chosen, because first link 13 swings in a range wider than that of second link 14. Also, the rubber bushing for exerting the biasing force may be disposed on either one of first pivot 15 or second pivot 16 in the similar manner as in the third embodiment.

Figure 14:
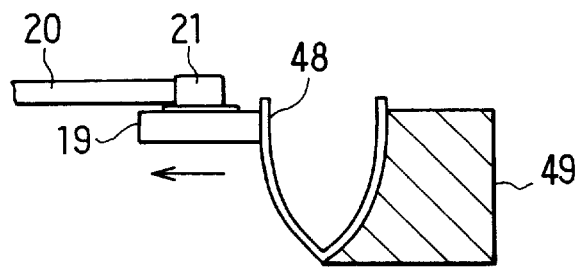
FIG. 14 is a fragmentary view showing a modified form of a biasing spring.
Figure 15:
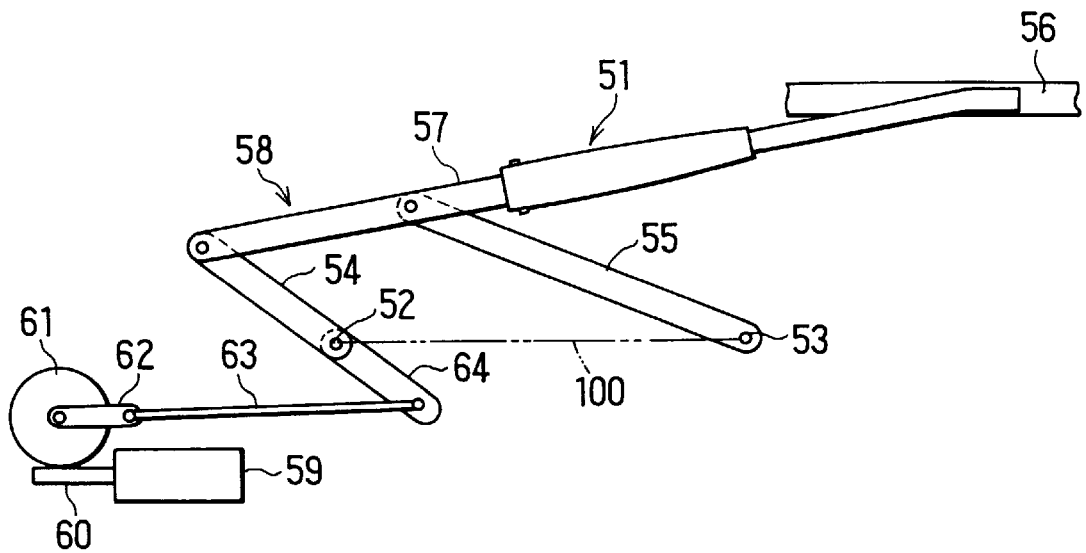
FIG. 15 is a schematic plan view showing a conventional windshield wiper in which a four-link linkage is used.
Figure 16:
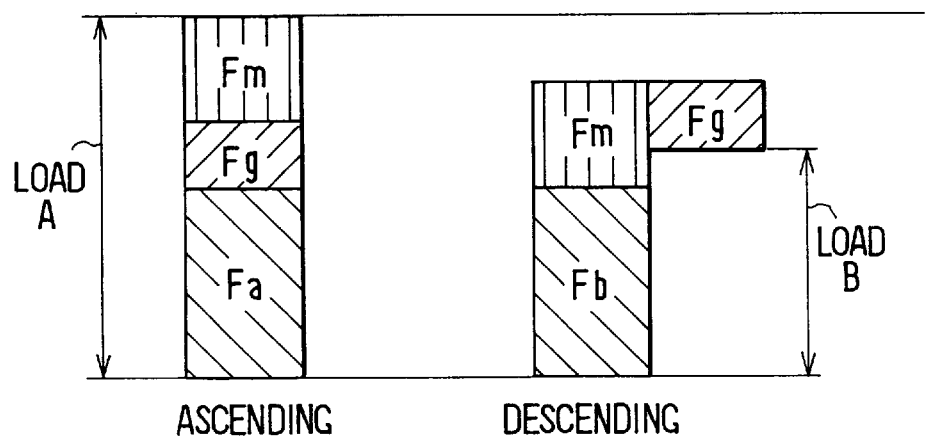
FIG. 16 is a graph showing load for driving the conventional windshield wiper shown in FIG. 15.

The coil spring used in the first and second embodiments for giving the biasing force to the wiper arm may be replaced by leaf spring 48 as shown in FIG. 14. One side of V-shaped leaf spring 48 is fixed to frame 49, and the other side thereof is disposed to contact the bottom end of actuator lever 19 so that leaf spring 48 is deformed in the direction of movement of the bottom end of actuator lever 19. Leaf spring 48 functions in the same manner as the coil spring. That is, the biasing force of leaf spring 48 assists the upward movement of the wiper arm from its bottom position.

It is also possible to apply the present invention to a wiper system in which more than three wiper arms are operated by a common motor. Also, the present invention is applicable to various wiper systems including a bus wiper system in which two wiper arms are driven in an opposite direction in synchronism with each other.

The arrangement of the biasing spring is not limited to those described in the foregoing embodiments, but it may be arranged differently. For example, the biasing spring may be arranged so that its biasing force reduces a difference of the motor loads required when the wiper arm is ascending and descending at a position where the motor road becomes maximum. More specifically, the biasing force may be utilized at the upper position if the wiper system has a structure in which the motor load becomes maximum at the upper position, or at any other position where the motor load becomes maximum. Also, the biasing force of a spring connected to the conventional wiper arm in the second embodiment may be utilized for assisting the lifting up of the wiper arm having the four-link linkage from its bottom position. Moreover, it is not necessary, though it is preferable, to equalize the motor loads required for ascending and descending the wiper arm at the vicinity of the bottom position, as long as the difference of the motor loads is reduced.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A windshield wiper comprising:
   an elongate wiper arm having a top end and bottom end;
   a wiper blade, connected to the top end of the wiper arm for wiping a windshield;
   a four-link linkage defined by said bottom end of wiper arm, link members, pivotally connected to said bottom end of the wiper arm and a stationary frame, said linkage for changing a wiping radius of the wiper arm;
   a drive mechanism, connected to the four-link linkage, for giving the wiper arm a wiping motion, a direction of which is switched to a downward motion at an upper position of the wiper arm and to an upward motion at a bottom position of the wiper arm; and
   a passive resilient biasing member disposed between and coupled to at least one of the link members and an axis supporting that link member, exerting a twisting force on that link member by a resilient force of the biasing member to reduce a maximum driving load imposed on the drive mechanism.

2. The windshield wiper as in claim 1, wherein:
   the passive resilient biasing member reduces a driving force difference before and after the direction of the wiping motion is switched at the upper and bottom positions.

3. The windshield wiper as in claim 2, wherein:
   the passive resilient biasing member assists the upward motion from the bottom position of the wiper arm so that the driving load imposed on the drive mechanism becomes substantially equal before and after the direction of the wiping motion is switched at the bottom position.

4. The windshield wiper as in claim 2, wherein:
   the passive resilient biasing member exerts a resilient force according to deformation thereof;
   the passive resilient biasing member is arranged so that no deformation thereof exists at an interim position between the upper and bottom positions of the wiper arm; and the resilient force is exerted on the wiper arm in a direction to assist the wiping motion after the direction of the wiping motion is switched at the upper and bottom positions.

5. The windshield wiper as in claim 2, 3 or 4, wherein:

the passive resilient biasing member is resiliently deformed in a direction of movement of at least a portion of the four-link linkage when the wiper arm is at the bottom position.

6. The windshield wiper as in claim 1, wherein the four-link linkage comprises:

a first link, one end of which is pivotally connected to a first pivot disposed at the bottom end of the wiper arm and the other end of which is pivotally connected to a first axis fixed to the stationary frame;

a second link, one end of which is pivotally connected to a second pivot disposed on the wiper arm apart from the first pivot and the other end of which is pivotally connected to a second axis fixed to the stationary frame apart from the first axis; and a stationary link formed between the first and second axes.

7. The windshield wiper as in claim 6, wherein:

the passive resilient biasing member is disposed between the second axis and the second link, so that the passive resilient biasing member exerts said twisting force on the second link.

8. The windshield wiper as in claim 7, wherein the passive resilient biasing member comprises:

an inner ring fixed to the second axis;

an outer ring fixedly connected to the second link; and a rubber bushing connected to both the inner ring and the outer ring.

9. The windshield wiper as in claim 1, wherein:

the passive resilient biasing member is a cylindrical-shaped rubber bushing.

10. A windshield wiper for use in an automobile comprising:

an elongate wiper arm having a top and a bottom end;

a wiper blade, connected to the top end of the wiper arm, for wiping the windshield;

a four-link linkage defined by said bottom end of the wiper arm, link members, pivotally connected to said bottom end of the wiper arm and a stationary frame of the automobile, said linkage for changing a wiping radius of the wiper arm, the four-link linkage comprising:

a first link, one end of which is pivotally connected to a first pivot disposed at the bottom end of the wiper arm and the other end of which is pivotally connected to a first axis fixed to the stationary frame;

a second link, one end of which is pivotally connected to a second pivot disposed on the wiper arm apart from the first pivot and the other end of which is pivotally connected to a second axis fixed to the stationary frame apart from the first axis; and a stationary link formed between the first and second axes;

a drive mechanism, connected to the four-link linkage, for giving the wiper arm a wiping motion, a direction of which is switched to a downward motion at an upper position of the wiper arm and to an upward motion at a bottom position of the wiper arm, and a passive resilient biasing member disposed between and coupled to at least one of the link members and an axis supporting that link member, exerting a twisting force on that link member by a resilient force of the biasing member to reduce a maximum driving load imposed on the drive mechanism.

11. The windshield wiper as in claim 10, wherein:

the passive resilient biasing member reduces a driving force difference before and after the direction of the wiping motion is switched at the upper and bottom positions.

12. The windshield wiper as in claim 11, wherein:

the passive resilient biasing member assists the upward motion from the bottom position of the wiper arm so that the driving load imposed on the drive mechanism becomes substantially equal before and after the direction of the wiping motion is switched at the bottom position.

13. The windshield wiper as in claim 10, 11, or 12, wherein:

the passive resilient biasing member is disposed between the second axis and the second link, so that the passive resilient biasing member exerts said twisting force on the second link.

14. The windshield wiper as in claim 13, wherein the passive resilient biasing member comprises:

an inner ring fixed to the second axis;

an outer ring fixedly connected to the second link; and a rubber bushing connected to both the inner ring and the outer ring.

15. The windshield wiper as in claim 11, wherein:

the passive resilient biasing member exerts a resilient force according to deformation thereof;

the passive resilient biasing member is arranged so that no deformation thereof exists at an interim position between the upper and bottom positions of the wiper arm; and the resilient force is exerted on the wiper arm in a direction to assist the wiping motion after the direction of the wiping motion is switched at the upper and bottom positions.

16. The windshield wiper as in claim 10, 11, 12 or 15, wherein:

the passive resilient biasing member is resiliently deformed in a direction of movement of the first link of the four-link linkage when the wiper arm is at the bottom position.

17. The windshield wiper as in claim 10, 11, 12 or 15, wherein:

the passive resilient biasing member is resiliently deformed in a direction of movement of the second link of the four-link linkage when the wiper are is at the bottom position.

* * * * *

UNITED STATES PATENT AND TRADEMARK OFFICE
CERTIFICATE OF CORRECTION

PATENT NO. : 6,105,199
DATED : August 22, 2000
INVENTOR(S) : Shuichi Irikura

It is certified that error appears in the above-identified patent and that said Letters Patent is hereby corrected as shown below:

Title page,
Change item [73] Assignee from "Amso Co. Ltd., Japan" to
-- ASMO Co. Ltd., Japan --.

Signed and Sealed this

Thirteenth Day of November, 2001

Attest:

NICHOLAS P. GODICI
Attesting Officer    Acting Director of the United States Patent and Trademark Office